Sept. 29, 1925.                                                              1,555,353
G. C. CAPPA
CONNECTING ROD WITH ROLLER BEARINGS
Filed Feb. 13, 1925
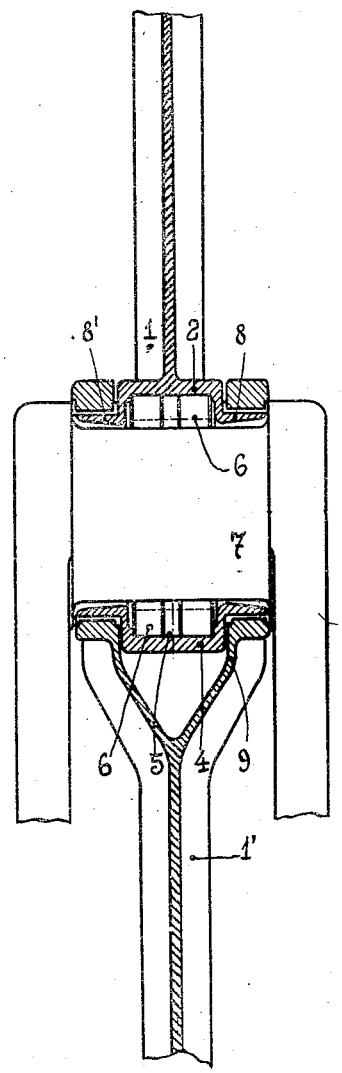
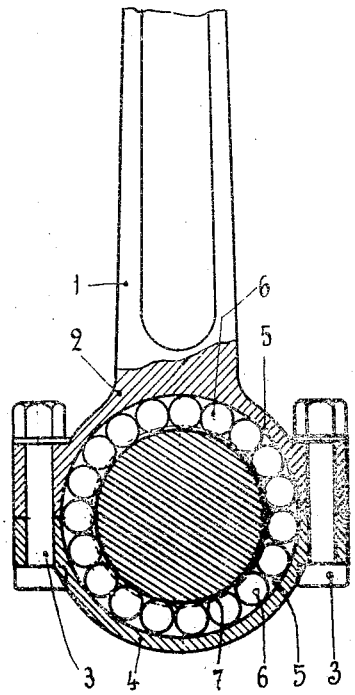
Inventor
Giulio Cesare Cappa
By [signature] atty.

Patented Sept. 29, 1925.

1,555,353

UNITED STATES PATENT OFFICE.

GIULIO CESARE CAPPA, OF TURIN, ITALY.

CONNECTING ROD WITH ROLLER BEARINGS.

Application filed February 13, 1925. Serial No. 8,903.

*To all whom it may concern:*

Be it known that I, GIULIO CESARE CAPPA, a subject of the King of Italy, residing at Turin, in the Kingdom of Italy, have invented certain new and useful Improvements in Connecting Rods with Roller Bearings; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to an improved arrangement of the heads of connecting rods with roller bearings for explosion engines. According to the invention the rollers are enclosed in a box formed by the head of the connecting rod itself which ensures adequate lubrication, owing to the fact that the oil cannot escape laterally from the rolling paths.

This arrangement considerably reduces the size of the head of the connecting rod in the longitudinal direction more particularly in the engines in which several rods act on the same crank pin.

The accompanying drawing shows by way of example a constructional form of the object of the invention.

Figure 1 is an axial longitudinal section of a group of two connecting rods acting on the same crank pin.

Figure 2 is a side view partly in section of a normal connecting rod.

1 denotes the stem of a connecting rod with a big end divided in two parts 2 and 4 secured together by means of bolts 3. In the two parts is formed a groove 5 containing the rollers 6, conveniently arranged on two rows, resting directly on the crank pin 7 which is conveniently hardened and rectified.

When a plurality, e. g. two connecting rods act on the same crank pin, one of them shall be made with two lateral cylindrical surfaces 8 and 8' to which is hinged the forked head 9 of the other connecting rod 1'. The groove 5 which must be sufficiently deep but, a little less, however, than the diameter of the rollers, is perfectly adapted for collecting the lubricating oil, a portion of which constantly remains in the groove and maintains the rollers 6 adequately lubricated.

The sides of the groove 5 are, as shown in Figure 1, not in contact with the ends of the rollers 6, except on a small outer rim, which takes the lateral thrust. In this way the contact between the rollers and sides is reduced to a minimum.

It is obvious that this fork can be made to fit more than one secondary connecting rod; the auxiliary connecting rods can be attached to the main rod in a different way from that described, and the constructional details may be varied from the above without departing from the spirit of the invention.

Claims:

1. In a multiple connecting rod assembly the combination with a plurality of connecting rods arranged for relative oscillation about a common center, of a main big end on one connecting rod formed of two parts bolted together, an intermediate deep groove in said two parts having small outer rims on the inner sides thereof, rollers in the groove cooperating with the said rims, and lateral cylindrical surfaces on the outer sides of the main big end loosely embracing the crankpin and adapted to support the big end of the other connecting rod.

2. In a multiple connecting rod assembly the combination with a plurality of connecting rods arranged for relative oscillation about a common center, of a main big end on one connecting rod, formed of two parts bolted together, an intermediate deep groove in said two parts and having small outer rims on the inner sides thereof, rollers in the groove cooperating with said rims, and lateral cylindrical surfaces on the outer sides of the main big end loosely embracing the crankpin and adapted to support the big end of the other connecting rod, the outer diameter of the said lateral surfaces being smaller than that of the main roller bearing.

In testimony whereof I affix my signature.

GIULIO CESARE CAPPA.